United States Patent [19]

Kirschmann

[11] 3,930,959

[45] Jan. 6, 1976

[54] COMBINED WATER COOLER & DISTILLER

[76] Inventor: John D. Kirschmann, 933 Anderson St., Bismarck, N. Dak. 58501

[22] Filed: Aug. 27, 1973

[21] Appl. No.: 392,121

[52] U.S. Cl. ............. 202/181; 202/185; 202/185 B; 202/187; 202/189; 202/203; 202/234; 159/DIG. 1; 203/11
[51] Int. Cl.² ...................... B01D 3/42; B01D 3/00
[58] Field of Search ........ 202/185 C, 185 D, 185 E, 202/187, 189, 203, 206, 233, 196, 181, 85 B; 159/24 A, DIG. 1; 203/10, 11

[56] References Cited
UNITED STATES PATENTS

| | | | |
|---|---|---|---|
| 878,744 | 2/1908 | Power | 202/185 X |
| 1,204,300 | 11/1916 | Moore | 202/185 D |
| 2,841,217 | 7/1958 | Goetz | 159/22 |
| 3,226,306 | 12/1965 | Hausner | 202/177 |
| 3,350,279 | 10/1967 | Tolchin | 159/DIG. 1 |
| 3,736,234 | 5/1973 | Miyamoto | 202/185 |

*Primary Examiner*—Jack Sofer
*Attorney, Agent, or Firm*—Williamson, Bains & Moore

[57] ABSTRACT

A combined water distiller and cooler having a boiler and a steam condenser incorporating an expansion chamber with an air inlet over a distilled water accumulating tank so that condensing steam and water condensate may mix with air to improve the potable quality of the distilled water before it drains into the accumulator tank. The evaporator of a refrigeration system used to cool the distilled water is located inside of the distilled water accumulator tank as is the steam condenser coil, so that the combined cooling effect of the refrigerant evaporator and the chilled distilled water are used to condense steam to water in the condenser coil.

4 Claims, 3 Drawing Figures

COMBINED WATER COOLER & DISTILLER

BRIEF SUMMARY OF THE INVENTION

This invention is directed to a combined water distiller and cooler for home and office use which provides the multiple advantages of having the distillation and cooling components compactly arranged in a housing no greater in size than ordinary bottled water coolers, of having a refrigeration system arranged to efficiently cool the accumulated distilled water and to also provide the requisite cooling to condense steam generated in the distillation process, and of having means of mixing ambient air with the steam condensate to enhance the taste and potable qualities of the water.

These basic objectives and advantages are achieved by providing a water boiler, steam condensing coil and distilled water accumulator tank in fluid flow relationship with the steam condensing coil being disposed in heat exchange relation with cool, distilled water accumulated in the tank. The evaporator of a compression-expansion refrigeration system is also disposed in heat exchange relation with the accumulated distilled water with the result that the refrigerant evaporator chills the distilled water and the combined cooling effect of the refrigerant evaporator and chilled distilled water serves to dissipate the latent heat of condensation of the condensing steam.

In the preferred embodiment of my invention, both the evaporator of the refrigeration system and the steam condensing coil are advantageously located directly within the distilled water accumulating tank to provide effective heat exchange and to conserve space. The outlet end of the steam condensing coil terminates within the upper end of an expansion vessel mounted directly on top of the distilled water accumulating tank and having an outlet at its bottom end opening into the accumulating tank; and air from the surrounding atmosphere admitted to the expansion vessel through an air tube is absorbed by the condensing steam and condensate flowing downwardly through the expansion chamber to the accumulator tank.

A further advantageous feature of my improved water distiller and cooler resides in the particular structure and mounting arrangement of a pressure switch within the distilled water accumulating tank so as to deactivate the boiler of the distillation system when distilled water rises to a predetermined level within the accumulator tank. The pressure switch is seated within a recess in a mounting ring on the top of the distilled water accumulating tank against which the bottom end of the aforesaid expansion vessel rests. A flexible, pressure sensitive diaphragm extends across the open end of the mounting ring recess in sealing engagement therewith and is displaceable in response to the pressure of distilled water at said predetermined level within the accumulator tank to actuate the pressure switch.

These and other objects and advantages of my invention will become readily apparent as the following description is read in conjunction with the accompanying drawings wherein like reference numerals have been used to designate like elements throughout the several views.

DESCRIPTION OF THE PREFERRED EMBODIMENT

Figure 1:
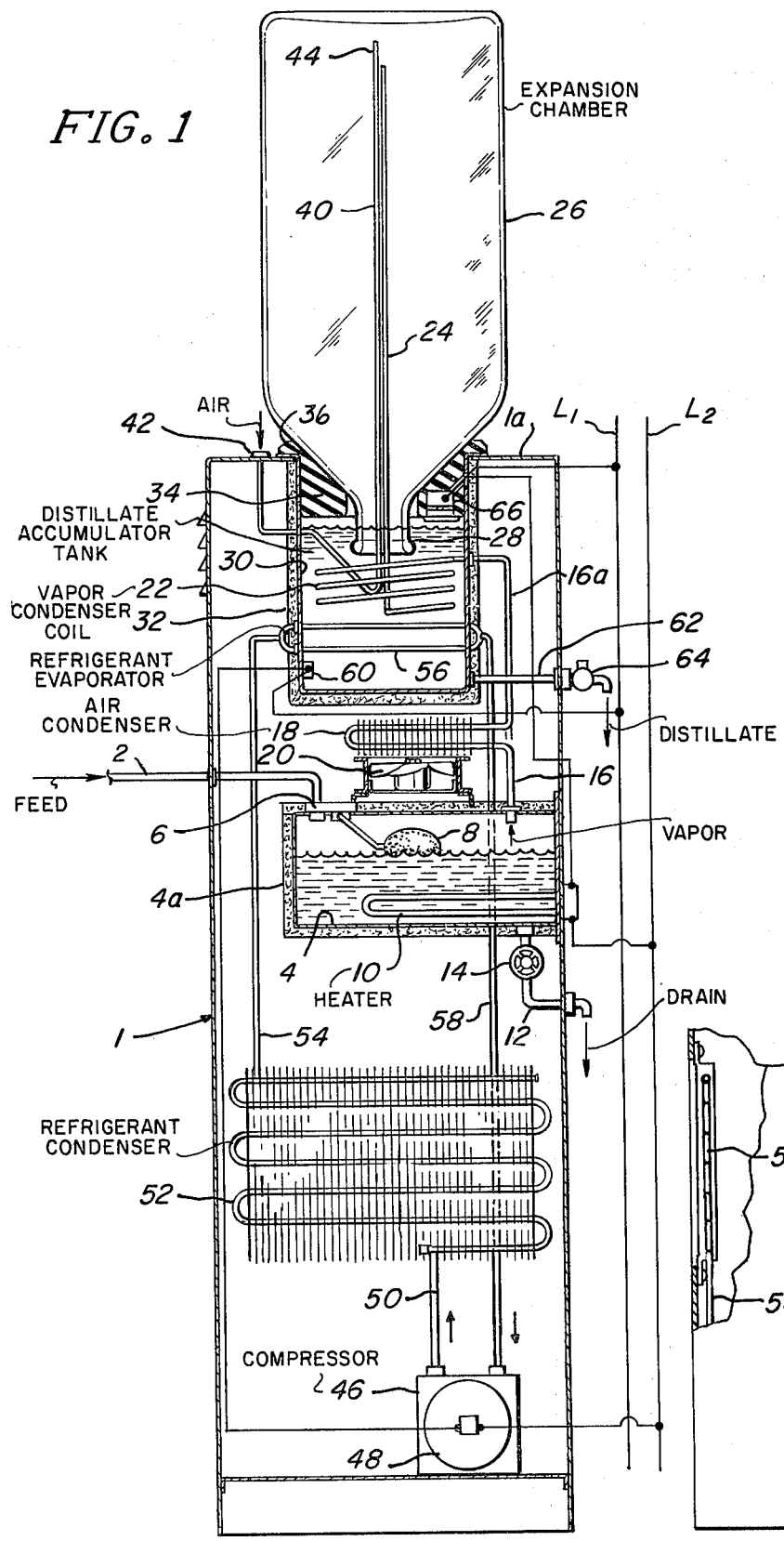
FIG. 1 is a sectional, side elevation view of the water distiller and cooler of this invention.

Referring now to the drawings, I have shown in FIG. 1 my improved water distiller and cooler apparatus compactly mounted within a housing or cabinet 1. The cabinet is of generally rectangular shape and houses a boiler 4 in the form of an insulated tank to which raw water is supplied from any convenient source through a conduit 2. Insulation 4a on boiler tank 4 precludes significant heat transfer from the boiler to adjacent components within cabinet 1. The flow of water into boiler tank 4 is controlled by a float valve 6 which is closed by the action of a float 8 when the water in tank 4 reaches a predetermined operating level therein. Although heat may be supplied to boiler tank 4 by various mean, I have found it particularly convenient and effective to use an electric heating element 10 disposed within tank 4 for this purpose. Mineral residue which periodically accumulates in the bottom of tank 4 may be drained off through a drain line 12 controlled by a hand valve 14. In lieu of hand valve 14, constant, controlled drainage of the residue from the bottom of tank 4 through line 12 could be accomplished by putting a restrictive orifice of predetermined size in line 12.

Attached to the top of boiler tank 4 in fluid flow communication therewith is a steam line 16 into which steam flows from the top of tank 4 as it is generated therein. In the embodiment of my invention shown in FIG. 1, steam line 16 is shown connected to an air-cooled condensing coil 18 over which air is directed by a fan 20 to assist in condensing the steam. This air cooled condenser 18 is optional only, and all of the requisite cooling for condensing steam to water may be achieved in a primary condensing coil 22 in a manner hereinafter explained. As is indicated by the phantom lines in FIG. 1, steam line 16 may be directly connected to downstream segment 16a thereof and air cooled condensing coil 18 connected between steam line segments 16 and 16a may be eliminated. Steam condensing coil 22 is connected to the outlet of steam line 16a and has a tubular outlet segment 24 extending up into an expansion chamber in the form of a glass bottle type of vessel 26.

Bottle 26 is mounted directly on top of a distilled water accumulating tank 30 with its neck 28 projecting into the top of the tank as shown. The neck 28 of bottle 26 is open and serves as an outlet at the bottom of bottle 26 to permit the flow of condensed, distilled water into accumulator tank 30. A layer of insulation 32 on the outside of tank 30 assists in preventing the transfer of heat to the chilled, distilled water which accumulates therein.

Positioned at the top of accumulating tank 30 is a flexible mounting ring 34, preferably made of rubber, which serves as a seating device for steam expansion bottle 26. Mounting ring 34 is angled as shown on its opposite sides to accommodate the sloping bottom ends of bottle 26 adjacent its neck 28. Annular flange extension 36 on the upper end of mounting ring 34 abuts against the top of an annular lip 38 formed on the top of accumulator tank 30. Tank 30 is suspended within the upper end of cabinet 1 by the abutting engagement of its flange lip 38 against the top surface 1a of cabinet 1.

For the purpose of providing air flow into and out of expansion chamber 26, I utilize an air flow passage which preferably takes the form of an elongated tube 40 having an open end which communicates with the surrounding atmosphere through a fitting 42 on the top wall 1a of cabinet 1. Air tube 40 extends downwardly from air pickup fitting 42 through the side wall of distilled water accumulating tank 30 and then upwardly through the open neck 28 of expansion bottle 26 to a point adjacent the top of bottle 26. The open, inner end 44 of air tube 40 is positioned as shown adjacent the upper end of tubular outlet segment 24 of steam coil 22.

The distilled water which accumulates in tank 30 is chilled for drinking purposes by a closed circuit refrigeration system comprised of a conventional refrigerant compressor 46 driven by an electric motor 48 and having a discharge line 50 connected to an air cooled condenser 52. Refrigerant liquid line 54 connects the outlet of condenser 52 by way of a capillary or other appropriate expansion device not shown with an evaporator coil 56. The closed refrigeration circuit is completed by suction line 58 connecting the outlet of evaporator 56 with the inlet of compressor 46. Evaporator 56 is placed directly within tank 30 below the normal level of accumulated distilled water, in direct heat exchange relation therewith as is clearly shown in FIG. 1.

The desired temperature of chilled, distilled water accumulating in tank 30 is maintained by a thermostat 60 positioned to sense the temperature of water in tank 30 and connected in a control circuit against power lines L1 - L2. Thermostat 60 is electrically connected to compressor motor 48 and serves to cycle the compressor drive motor off and on as required to maintain the desired temperature of distilled water in tank 30. Distilled water may be periodically drawn off as required through a tap line 62 having a manually operable valve 64 connected therein.

Figure 2:
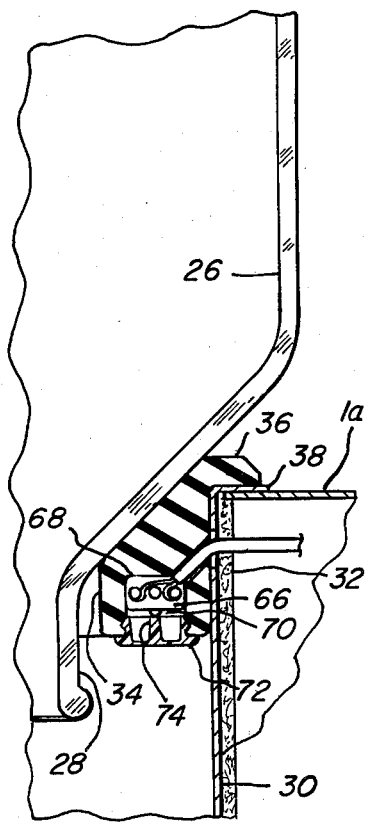
FIG. 2 is a fragmentary, vertical section view of a portion of the apparatus of FIG. 1 showing on an enlarged scale the expansion vessel and pressure switch mounting arrangement.
Figure 3:
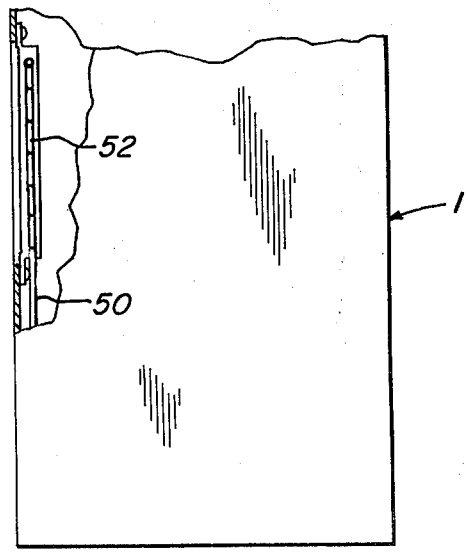
FIG. 3 is a front view, partially broken away, of the water distiller and cooler unit of FIG. 1.

The generation of distilled water is controlled by regulating the operation of electric heating element 10 within boiler tank 4 by means of a pressure control switch 66. As may be understood most clearly by reference to FIG. 2, pressure switch 66 is also connected in the control circuit across power lines L1 - L2 and is advantageously housed within a recess 68 formed in the bottom end of mounting ring 34 to provide a means of sealing the electrical contacts of switch 66 from exposure to water within tank 30. Switch 66 has an actuating element in the form of a displaceable botton 70 which serves to open the contacts across switch 66 when it is displaced upwardly or inwardly. A pressure responsive diaphragm 72 extends across the open, bottom end of recess 68 and serves a dual function of sealing the open end of recess 68 to protect the pressure switch contacts from moisture and actuating switch 66 in response to the pressure of accumulated, distilled water within tank 30 when the accumulated water rises to a predetermined level therein. Pressure responsive diaphragm 72 has a central web 74 in line with switch contact button 70 which is urged upwardly to trip button 70 and open the switch contacts when the water level within tank 30 reaches a predetermined point near the top of the tank where diaphragm 72 is located and forces it upwardly. Diaphragm 72 is exposed to the interior of accumulating tank 30 at its upper end as shown in FIGS. 1 and 2 across the bottom, open end of recess 68. As is clearly indicated in FIG. 1, the contacts of pressure control switch 66 are connected in the control circuit with electric heating element 10. Thus, when the contacts of pressure switch 66 are opened by the upward flexing of diaphragm 72 in response to the attainment of the predetermined distilled water level within tank 30, electric heating element 10 is de-energized to stop the operation of the boiler and the generation of steam.

It is believed that the general mode of operation of the water distiller and cooling apparatus disclosed herein will be understood from the foregoing description. The operating cycle may be briefly summarized by saying that when the level of accumulated distilled water drops below pressure responsive diaphragm 72 within tank 10, heating element 10 will be energized to generate steam from raw water introduced into boiler tank 4 through float-operated control valve 6 and supply line 2. The steam will flow upwardly out of tank 4 through conduit 16 to be cooled and condensed in condensing coil 22. It is to be noted that air cooled, steam condensing coil 18 will normally not be required if compressor 46 is properly sized in conjunction with evaporator coil 56 to provide the total cooling capacity needed to condense the steam and chill distilled water accumulating in tank 30. With such a preferred mode of operation, steam will flow directly through outlet conduit 16 into steam line segment 16a and then into condensing coil 22 disposed within tank 30 where it is cooled to its condensation or saturation temperature. The combined cooling effect of evaporator coil 56 and of the body of chilled distilled water within tank 30 in which coil 22 is immersed serves to cool the steam to its condensation temperature. The pressure generated in the steam line from boiler tank 4 will force the uncondensed steam and steam condensate upwardly within tubular outlet segment 24 of condensing coil 22 into expansion chamber 26. The additional cooling effect provided as the steam and steam condensate expands from the outlet end of tubular segment 24 into the top of chamber 26 serves to condense any uncondensed steam to water and the distilled water condensate flows downwardly within expansion chamber 26 through its open bottom end into accumulating tank 30.

Air tube 40 serves to introduce ambient air into the top of expansion chamber 26 to maintain atmospheric pressure on the top of the distilled water accumulating in tank 30 to ensure free flowing discharge to outlet conduit 62 and also to aerate the accumulated distilled water. This aeration of the distilled water produces a much better tasting, and thus more potable quality of distilled water. It will of course be understood that air will flow from the surrounding atmosphere into expansion chamber 26 only when there are no boiling and condensing operations taking place. The pressure in expansion chamber 26 will exceed atmospheric pressure during such distilling operations. As a result excessive air in chamber 26 will be vented to the atmosphere through tube 40 and prevent an undue pressure build-up in expansion chamber 26 which might otherwise interfere with the condensing process.

For obvious safety reasons, an additional control switch may be utilized to de-energize electric heating element 10 when there is no water within boiler tank 4 even though the level of distilled water in tank 30 may have dropped below the critical level at which pressure control switch 66 would actuate heating element 10.

I anticipate that various other conditions and variations may be made in the combined water distiller and cooler disclosed herein without departing from the spirit and scope of my invention as defined by the following claims.

What is claimed is:

1. A combination water distiller and cooler comprising:
   a boiler container and associated heating means for generating steam from water;
   a raw water supply conduit connected to said boiler container;
   a steam condensing coil in fluid flow communication with said boiler container;
   a distilled water accumulating tank in fluid flow communication with the outlet of said condensing coil, said condensing coil being disposed in heat exchange relation with distilled water accumulated in said tank;
   a refrigerant compressor, condenser and evaporator interconnected in refrigerant flow relationship in a closed refrigeration circuit, said evaporator being disposed in heat exchange relation with said accumulating tank so as to cool the water accumulating therein, the cooling effect of said evaporator and cooled distilled water serving to condense steam flowing through said steam condensing coil;
   an expansion chamber in the form of a vessel mounted on the top of said distilled water accumulating tank and having an outlet of reduced area at the bottom end thereof opening into the upper end of said accumulating tank, and said steam condensing coil terminating in a tubular segment extending upwardly within said vessel through said outlet at the bottom end thereof to a point adjacent the top of said vessel; and
   air flow passage means extending upwardly inside of said vessel through said outlet at the bottom thereof and having a first open end exposed to the surrounding atmosphere and a second open end within said vessel.

2. A water distiller as defined in claim 1 wherein:
   said air flow passage means comprises an air conduit extending upwardly inside of said vessel through said outlet at its bottom end from a point outside of said vessel exposed to the surrounding atmosphere.

3. A water distiller as defined in claim 1 wherein:
   said expansion chamber is in the form of a vessel mounted on the top of said accumulating tank with its bottom end resting on a flexible mounting ring interposed between the top of said accumulating tank and the bottom of said vessel; and
   said heating means for said boiler comprises an electric heating element disposed therein, said heating element being connected to an electric power source in a control circuit; and
   pressure control switch means connected to said heating element in said control circuit and mounted within a recess in said mounting ring, said switch means having a pressure responsive element exposed to the interior of said accumulating tank and displaceable in response to the pressure of water at a predetermined level within said tank to open the circuit to said electric heating element and thereby de-energize said heating element when distilled water accumulated in said tank reaches said predetermined level.

4. A water distiller as defined in claim 3 wherein:
   said recess in said mounting ring is disposed inside of said accumulator tank at the upper end thereof; and
   said pressure responsive element comprises a flexible diaphragm extending across the open end of said recess over said switch means in sealing engagement with said mounting ring.

* * * * *